United States Patent Office 3,513,506
Patented May 26, 1970

3,513,506
CLAMPING MECHANISM
Erwin Meingast, Treuchtlingen, Germany, assignor to Eckert & Ziegler G.m.b.H., Weissenburg, Bayer, Germany
Filed Apr. 19, 1967, Ser. No. 632,026
Claims priority, application Germany, Apr. 22, 1966,
E 31,499
Int. Cl. B29f 1/06
U.S. Cl. 18—30                                    11 Claims

ABSTRACT OF THE DISCLOSURE

The clamping mechanism of an injection molding machine comprises two pairs of mutually inclined toggle links whose outer ends are respectively pivoted to a stationary member and a reciprocable platen. The inner ends of all links are pivoted to a hydraulic double acting cylinder which is disposed between such inner ends so that it need not extend beyond the area in which the inner ends of links move when the platen is caused to move toward or away from the stationary member.

The piston rod of the cylinder is connected with the platen and stationary member by two rods which are inclined with reference to the toggle links.

BACKGROUND OF THE INVENTION

The present invention relates to injection molding machines in general, and more particularly to improvements in clamping mechanisms which are utilized in such machines to open and close the mold and to maintain the mold in closed position under requisite clamping pressure. Still more particularly, the invention relates to improvements in so-called hydraulic and mechanical toggle clamps for clamping mechanisms of injection molding machines.

It is an important object of the present invention to provide a novel and improved clamping mechanism which occupies less room than presently known clamping mechanisms for injection molding machines.

Another object of the invention is to provide a novel and improved mounting for the prime mover of a clamping mechanism which embodies one or more toggle joints.

Another object of the invention is to provide a clamping mechanism of the type wherein the toggle joints receive motion from a fluid-operated prime mover and to construct and assemble the prime mover in such a way that it constitutes a component part of the toggle joints.

A concomitant object of the invention is to provide a clamping mechanism which can be utilized as a simplified, cheaper and space-saving substitute for conventional clamping mechanisms in presently known injection molding or like machines wherein a movable part must be maintained in a selected position by simultaneous application of a requisite closing, sealing and/or locking force.

Still another object of the invention is to provide a closing mechanism which can be utilized to locate and to apply a requisite force to a member which is movable in a horizontal, vertical or otherwise inclined path.

An ancillary object of the invention is to provide a clamping mechanism which is safer than presently known clamping mechanisms and which can be operated by the customary timing or cycle controls of an injection molding machine in synchronism with the injection assembly of such machine.

SUMMARY OF THE INVENTION

My invention resides in the provision of a clamping mechanism which can be utilized in injection molding machines. The mechanism comprises a first member which can be constituted by a stationary portion of the machine frame and a second member which is reciprocable toward and away from the first member and may constitute a movable platen of the injection molding machine. The mechanism further comprises at least one pair of mutually inclined toggle links whose outer end portions are pivoted to the respective members and whose inner end portions are pivoted to a prime mover which is preferably constituted by a double-acting hydraulic cylinder and piston unit having a cylinder element and a piston element. In accordance with an important feature of my invention, one of these elements is disposed between the inner end portions of the toggle links so that it occupies an area wherein the inner end portions of the links move when the second member is caused to travel toward or away from the first member. The one element may be constituted by the cylinder element, and such cylinder element may be directly or indirectly pivoted to the inner end portions of the toggle links.

The novel features which are considered as characteristic of the invention are set forth in particular in the appended claims. The improved clamping mechanism itself, however, both as to its construction and its mode of operation, together with additional features and advantages, thereof, will be best understood upon perusal of the following detailed description of certain specific embodiments with reference to the accompanying drawing.

BRIEF DESCRIPTION OF THE DRAWING

The single illustration is in FIG. 1 a partly elevational and partly sectional view of a clamping mechanism which embodies my invention and is utilized to reciprocate the platen of an injection molding machine, and in FIG. 2 an enlarged sectional view along line A—A in FIG. 1.

DESCRIPTION OF THE PREFERRED EMBODIMENTS

Figure 1:
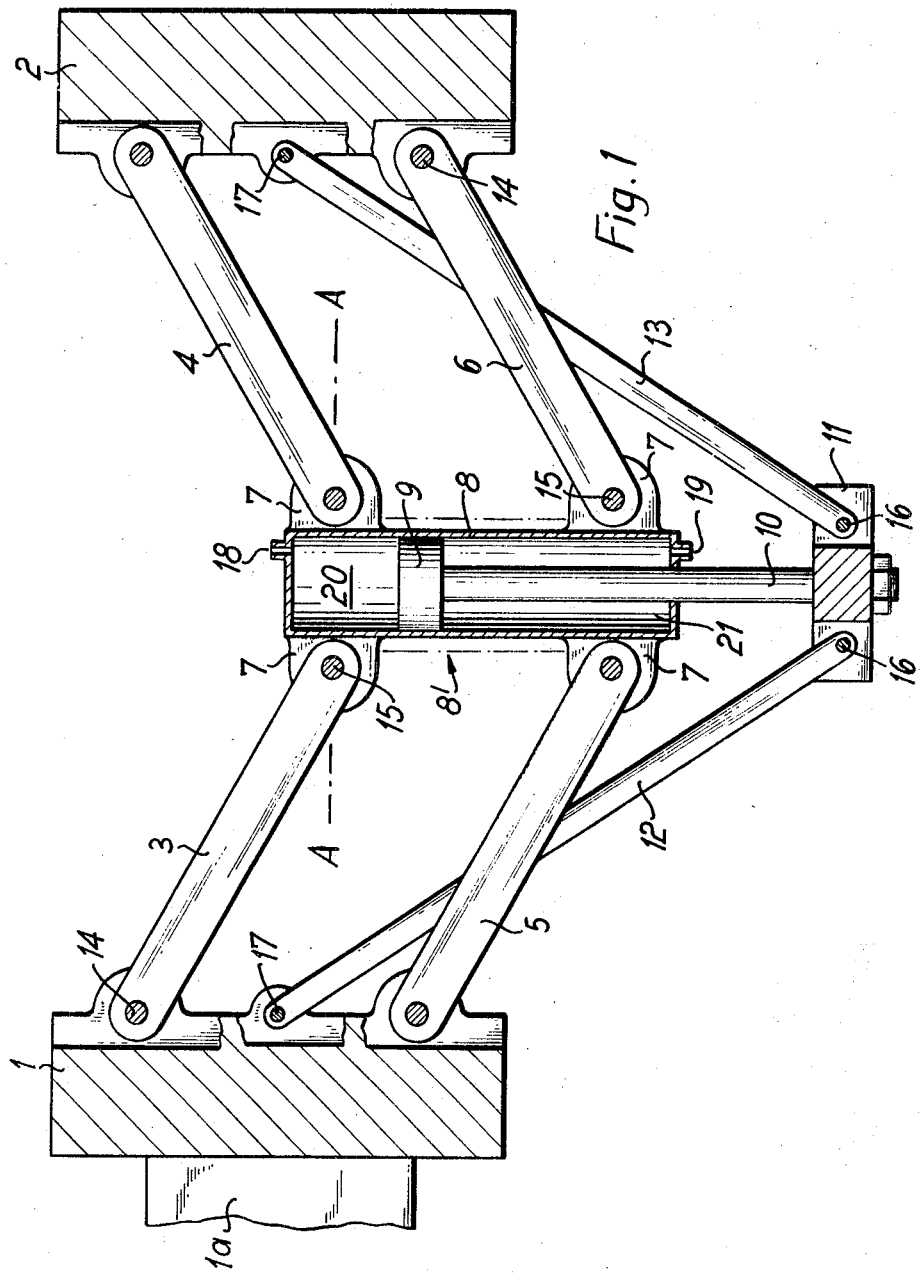
Figure 2:
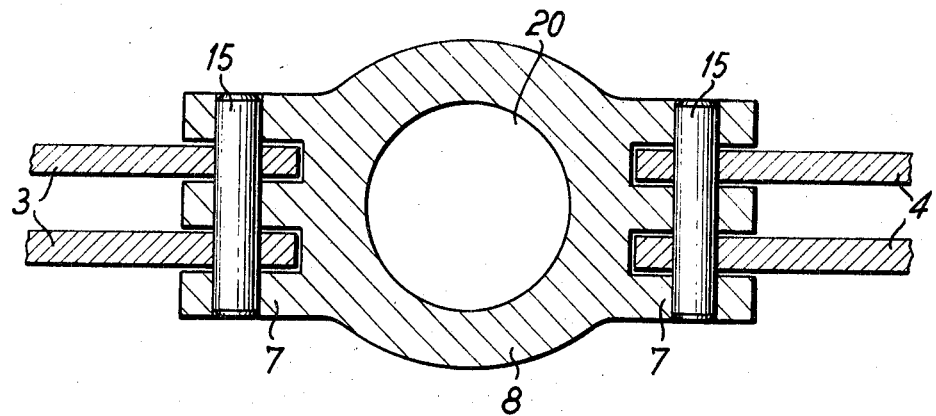

The drawing illustrates a clamping mechanism which is incorporated in an injection molding machine and includes a stationary member or crosshead 2 which forms part of the machine frame and a movable member 1 constituting the reciprocable platen of the machine and carrying a mold section 1a. When the platen 1 is shifted in a direction to the left, as viewed in the drawing, the section 1a bears a complementary mold section (not shown) which is mounted on a second platen. The platen 1 is reciprocably guided by conventional tie rods which are not shown in the drawing. The clamping mechanism further includes two pairs of simple non-bifurcated toggle links 3, 4 and 5, 6. The outer end portions of the links 3, 5 and 4, 6 are respectively pivoted to the platen 1 and member 2 by parallel pins 14, and the inner end portions of these links are connected with a coupling element 8 which is provided with projections in the form of lugs 7. These lugs have slots which receive portions of pivot pins 15.

In the illustrated embodiment, the coupling element 8 constitutes the cylinder of a hydraulic prime mover which serves to pivot the links 3–6 and is accommodated in the region between the inner end portions of such links. Thus, this cylinder occupies only such space which is needed for unimpeded movement of links 3–6 irrespective of the construction of the prime mover. This results in considerable savings in space, either vertically or horizontally, depending on whether the axis of the cylinder 8 is horizontal, vertical or inclined with reference to a horizontal and a vertical plane.

The cylinder 8 accommodates a piston 9 having a piston rod 10 which is connected to a carrier or crosshead 11 coupled with the inner end portions of two elongated rods 12, 13 by pivot pins 16. Pivot pins 17 respectively connect the outer end portions of rods 12, 13 with the platen 1 and member 2. The parts 11, 12, 13, 16 and 17 form a third toggle joint which centers the piston rod 10. The inclination of rods 12, 13 with reference to the axis of the cylinder 8 is different from that of the links 3–6.

It is equally within the purview of the present invention to provide the clamping mechanism with a prime mover which comprises two or more hydraulic cylinders and to install such cylinders on a coupling element 8' (shown by phantom lines) which includes the lugs 7 and is pivotally connected with the links 3–6. In other words, the pins 15 may be indirectly connected with the prime mover through the intermediary of the coupling element 8'. Also, the clamping mechanism may comprise a single pair of toggle links (3, 4 or 5, 6) or three or more pairs of such links.

The cylinder 8 is of the double-acting type and comprises two openings 18, 19 which can respectively admit or evacuate hydraulic fluid from cylinder chambers 20 and 21. The system of valves which control the flow of hydraulic fluid into and from the chambers 20, 21 is of conventional design and is not shown in the drawing. Such valves can be operated in synchronism with the customary injection assembly which admits plasticized material into the mold cavity.

When the fluid is caused to flow into the upper chamber 20 and to escape from the lower chamber 21, the volume of the chamber 20 increases and the cylinder 8 moves upwardly, as viewed in the drawing, whereby the angle between the links 3, 4 and 5, 6 increases so that the platen 1 travels in a direction to the left and moves the mold section 1a into sealing engagement with the other mold section. The rods 12, 13 oppose but cannot prevent movement of the platen 1 away from the stationary member 2 for reasons which will be readily evident.

When the valves admit fluid into the chamber 21 and permit escape of fluid from the chamber 20, the volume of the chamber 21 increases and the cylinder 8 travels downwardly to effect opening of the mold.

It was found that the clamping mechanism of the present invention is less likely to cause injury to workmen than such clamping mechanisms which are presently used in injection molding machines. This is attributed to the fact that the cylinder 8 is accommodated in the space between the inner end portions of the toggle links 3–6 so that it need not extend well beyond the line of movement of the platen 1. The crosshead 11 and the rods 12, 13 could be replaced by a slide or carriage travelling in parallelism with the platen 1 so that the piston rod 10 and piston 9 would reciprocate at half the speed of but in the same direction as the platen. If the latter reciprocates in a horizontal path, the piston rod 10 can extend upwardly, downwardly or in any other direction substantially radially of such path. If the platen 1 reciprocates in a vertical path, the piston rod 10 will be located in a horizontal plane.

Another important advantage of my clamping mechanism is seen to reside in that the space requirements of the prime mover do not increase when the platen 1 is moved away from the stationary member 2. This is also attributed to the fact that the cylinder 8 extends into the space between the inner end portions of the links 3–6 and actually constitutes an integral part of the twin toggle joint.

A further important advantage of the clamping mechanism is that the end portions of the toggle links 3–6 need not be bifurcated as in conventional hydraulic and mechanical toggles. Slotting or forking weakens the links which, of course, is a serious drawback in injection molding machines wherein the clamping mechanism must transmit and withstand extremely high stresses. The links 3–6 may be made of inexpensive flat metallic stock.

Without further analysis, the foregoing will so fully reveal the gist of the present invention that others can, by applying current knowledge, readily adapt it for various applications without omitting features which fairly constitute essential characteristics of the generic and specific aspects of my contributions to the art and, therefore, such adaptations should and are intended to be comprehended within the meaning and range of equivalence of the claims.

What is claimed as new and desired to be protected by Letters Patent is set forth in the appended claims:

1. A clamping mechanism, particularly for opening, closing and applying sealing pressure to mold sections in injecetion molding machines, comprising a first member, a reciprocable second member spaced from said first member, a pair of toggle links each having an outer end portion articulately connected with one of said members and an inner end portion; a prime mover for changing the mutual inclination of said links to thus displace said second member toward or away from said first member, said prime mover including a cylinder element articulately connected with said inner end portions, and a piston element; and support means articulately connected with said piston element and with said first and second members, respectively, for guiding said prime mover for movement so that the same moves to a location at least substantially within the confines of the space between said first and second members when the latter move away from one another.

2. A clamping mechanism as defined in claim 1, wherein said cylinder element is provided with projections and further comprising pivot means articulately connecting said projections with the inner end portions of said links.

3. A clamping mechanism as defined in claim 1, wherein said piston element comprises a piston rod having a portion extending from said cylinder element, and said support means comprising a pair of rods each providing an articulate connection between said portion of the piston rod and one of said members.

4. A clamping mechanism as defined in claim 3, wherein each of said rods is inclined with reference to one of said links.

5. A clamping mechanism as defined in claim 4, wherein said links make with each other a first angle and said rods make with each other a second angle which is smaller than said first angle.

6. A clamping mechanism as defined in claim 1, wherein said cylinder element is of the double-acting type.

7. A clamping mechanism as defined in claim 1, further comprising a second pair of toggle links each parallel to one of said first mentioned links and each having an outer end articulately connected to one of said members and an inner end articulately connected to said cylinder element of said prime mover.

8. A clamping mechanism as defined in claim 1, wherein said second member is constituted by a movable platen of an injection molding machine.

9. A clamping mechanism as defined in claim 1, wherein said inner ends of said links are articulately connected to said cylinder element at circumferentially spaced locations of the latter.

10. A clamping mechanism as defined in claim 3 further comprising a second pair of toggle links each parallel to one of said first mentioned links and each having an outer end articulately connected to one of said members and an inner end connected to said cylinder element of said prime mover.

11. A clamping mechanism as defined in claim 10, each of said pair of rods having a first end portion articulately connected to said portion of said piston rod, and a second end portion articulately connected to one of said members intermediate said outer ends of the respective links of said first-mentioned pair and of said second pair.

References Cited

UNITED STATES PATENTS

| | | |
|---|---|---|
| 2,113,115 | 4/1938 | MacMillin et al. |
| 3,015,131 | 1/1962 | Hehl. |
| 3,335,463 | 8/1967 | Allard et al. |
| 3,346,923 | 10/1967 | Bronn et al. |

FOREIGN PATENTS

| | | |
|---|---|---|
| 803,744 | 7/1936 | France. |
| 840,579 | 6/1952 | Germany. |

J. SPENCER OVERHOLSER, Primary Examiner

M. O. SUTTON, Assistant Examiner

U.S. Cl. X.R.

18—16